(12) United States Patent
Kennedy et al.

(10) Patent No.: US 11,197,329 B2
(45) Date of Patent: Dec. 7, 2021

(54) METHOD AND SYSTEM FOR GENERATING FUELING INSTRUCTIONS FOR A VEHICLE

(71) Applicant: Platform Science, Inc., La Jolla, CA (US)

(72) Inventors: John C. Kennedy, San Diego, CA (US); Don Son, San Diego, CA (US); Scott Kopchinsky, San Diego, CA (US); Emily Stuart, San Diego, CA (US)

(73) Assignee: Platform Science, Inc., San Diego, CA (US)

( * ) Notice: Subject to any disclaimer, the term of this patent is extended or adjusted under 35 U.S.C. 154(b) by 34 days.

(21) Appl. No.: 16/912,265

(22) Filed: Jun. 25, 2020

(65) Prior Publication Data
US 2020/0329512 A1    Oct. 15, 2020

Related U.S. Application Data

(63) Continuation-in-part of application No. 16/870,955, filed on May 9, 2020, and a continuation-in-part of
(Continued)

(51) Int. Cl.
*H04W 76/10* (2018.01)
*H04L 29/08* (2006.01)
(Continued)

(52) U.S. Cl.
CPC ............. *H04W 76/10* (2018.02); *H04L 67/12* (2013.01); *H04W 4/40* (2018.02); *H04W 76/19* (2018.02); *H04W 84/005* (2013.01); *H04W 84/12* (2013.01)

(58) Field of Classification Search
CPC ....... H04W 76/10; H04W 76/19; H04W 4/40; H04W 84/005; H04W 84/12; H04W 4/44;
(Continued)

(56) References Cited

U.S. PATENT DOCUMENTS 5,579,233 A    11/1996  Burns
5,954,773 A     9/1999  Luper
(Continued)

FOREIGN PATENT DOCUMENTS

GB         2449476       11/2008
WO    WO2016/012064     1/2016

OTHER PUBLICATIONS

International Search Report for PCT Application PCT/US2017/037825, dated Sep. 21, 2017.
(Continued)

*Primary Examiner* — Kyaw Z Soe
(74) *Attorney, Agent, or Firm* — Clause Eight; Michael Catania

(57) ABSTRACT

A system (900) and method (1100) instructing a vehicle (910) where and when to refuel is disclosed herein. The system (900) comprises a server (925) for receiving a workflow for a vehicle (910). The workflow comprises an origination location (901) of the vehicle, a destination (950) of the vehicle (910), a route (905) to the destination, a cargo, a time of departure and a time of arrival. The server (925) determines a plurality of fuel stops (930) along the route (905).

20 Claims, 13 Drawing Sheets

Related U.S. Application Data application No. 16/664,906, filed on Oct. 27, 2019, now Pat. No. 10,803,682, said application No. 16/870,955 is a continuation-in-part of application No. 16/416,396, filed on May 20, 2019, now Pat. No. 10,652,935, which is a continuation-in-part of application No. 16/118,436, filed on Aug. 31, 2018, now Pat. No. 10,334,638, which is a continuation of application No. 15/917,633, filed on Mar. 11, 2018, now Pat. No. 10,070,471, said application No. 16/664,906 is a continuation of application No. 15/859,380, filed on Dec. 30, 2017, now Pat. No. 10,475,258, said application No. 15/917,633 is a continuation of application No. 15/624,814, filed on Jun. 16, 2017, now Pat. No. 9,961,710, said application No. 15/859,380 is a continuation-in-part of application No. 15/624,814, filed on Jun. 16, 2017, now Pat. No. 9,961,710.

(60) Provisional application No. 62/867,845, filed on Jun. 27, 2019, provisional application No. 62/441,290, filed on Dec. 31, 2016, provisional application No. 62/441,298, filed on Dec. 31, 2016, provisional application No. 62/352,014, filed on Jun. 19, 2016.

(51) Int. Cl.
  *H04W 76/19* (2018.01)
  *H04W 4/40* (2018.01)
  *H04W 84/00* (2009.01)
  *H04W 84/12* (2009.01)

(58) Field of Classification Search
  CPC ...... H04W 4/024; H04L 67/12; H04L 67/125; H04L 67/02; H04L 67/06; H04L 67/18; G01C 21/3453
  See application file for complete search history.

(56) References Cited

U.S. PATENT DOCUMENTS

| | | |
|---|---|---|
| 5,995,898 A | 11/1999 | Tuttle |
| 6,292,724 B1 | 9/2001 | Apsell et al. |
| 6,526,341 B1 | 2/2003 | Bird et al. |
| 6,611,686 B1 | 8/2003 | Smith et al. |
| 6,651,001 B2 | 11/2003 | Apsell |
| 6,735,150 B2 | 5/2004 | Rothman |
| 6,925,308 B2 | 8/2005 | Goldsmith et al. |
| 7,043,365 B2 | 5/2006 | Inbar et al. |
| 7,079,230 B1 | 7/2006 | McInerney et al. |
| 7,092,803 B2 | 8/2006 | Kapolka et al. |
| 7,327,250 B2 | 2/2008 | Harvey |
| 7,350,707 B2 | 4/2008 | Barkan |
| 7,555,378 B2 | 6/2009 | Larschan et al. |
| 7,616,105 B2 | 11/2009 | Macielinski et al. |
| 7,725,216 B2 | 5/2010 | Kim |
| 8,626,144 B2 | 1/2014 | Talty et al. |
| 8,626,568 B2 | 1/2014 | Warkentin et al. |
| 8,789,161 B2 | 7/2014 | Jeal |
| 8,855,626 B2 | 10/2014 | O'Toole et al. |
| 9,032,493 B2 | 5/2015 | Lortz et al. |
| 9,064,422 B2 | 6/2015 | Mohn et al. |
| 9,147,335 B2 | 9/2015 | Raghunathan et al. |
| 9,215,590 B2 | 12/2015 | Bondesen et al. |
| 9,256,992 B2 | 2/2016 | Davidson |
| 9,262,934 B2 | 2/2016 | Mohn et al. |
| 9,275,010 B2 | 3/2016 | Kote et al. |
| 9,376,090 B2 | 6/2016 | Gennermann |
| 9,390,628 B2 | 7/2016 | Mohn et al. |
| 9,445,447 B2 | 9/2016 | Pal et al. |
| 9,544,768 B2 | 1/2017 | Steffey et al. |
| 9,578,668 B2 | 2/2017 | Sim |
| 9,632,506 B2 | 4/2017 | Wellman et al. |
| 9,671,241 B2 | 6/2017 | Tang |
| 9,961,710 B2 | 5/2018 | Son et al. |
| 10,070,471 B2 | 9/2018 | Son et al. |
| 10,255,575 B2 | 4/2019 | Warkentin et al. |
| 10,255,606 B2 | 4/2019 | Harter et al. |
| 10,334,638 B2 | 6/2019 | Son et al. |
| 10,475,258 B1 | 11/2019 | Son et al. |
| 2008/0137860 A1 | 6/2008 | Silvernail |
| 2009/0099724 A1 | 4/2009 | Kranz et al. |
| 2009/0276115 A1 | 11/2009 | Chen |
| 2011/0080256 A1 | 4/2011 | Mehalschick, Sr. |
| 2012/0161927 A1 | 6/2012 | Pierfelice et al. |
| 2012/0254960 A1 | 10/2012 | Lortz et al. |
| 2012/0262283 A1 | 10/2012 | Biondo et al. |
| 2013/0017816 A1 | 1/2013 | Talty et al. |
| 2013/0046846 A1 | 2/2013 | Mason et al. |
| 2013/0304276 A1 | 11/2013 | Flies |
| 2014/0162598 A1 | 6/2014 | Villa-Real |
| 2014/0213176 A1 | 7/2014 | Mendelson |
| 2014/0223235 A1 | 8/2014 | Gundlapalli et al. |
| 2014/0232569 A1 | 8/2014 | Skinder et al. |
| 2015/0099500 A1 | 4/2015 | Chalmers |
| 2015/0120135 A1 | 4/2015 | Lawrenson |
| 2015/0215986 A1 | 7/2015 | Lei et al. |
| 2015/0339334 A1 | 11/2015 | Hanke |
| 2015/0365979 A1 | 12/2015 | Park |
| 2016/0011001 A1 | 1/2016 | Emory et al. |
| 2016/0066127 A1 | 3/2016 | Choi et al. |
| 2016/0084657 A1 | 3/2016 | Schilling et al. |
| 2016/0150588 A1 | 5/2016 | Yae |
| 2016/0247153 A1 | 8/2016 | Leseky |
| 2016/0277923 A1 | 9/2016 | Steffey et al. |
| 2016/0343255 A1* | 11/2016 | Warren ............... G07C 5/0808 |
| 2017/0011561 A1 | 1/2017 | Makke et al. |
| 2017/0017927 A1 | 1/2017 | Domnick et al. |
| 2017/0104728 A1 | 4/2017 | Girard et al. |
| 2017/0178035 A1 | 6/2017 | Grimm et al. |
| 2018/0376522 A1 | 12/2018 | Son et al. |
| 2020/0344824 A1* | 10/2020 | Kennedy ............... H04L 67/306 |
| 2020/0413458 A1* | 12/2020 | Kennedy ................. H04L 67/18 |

OTHER PUBLICATIONS

European Search Report for EP Application 17815967.9 dated Dec. 4, 2019.

Office Action for U.S. Appl. No. 15/624,814, dated Aug. 22, 2017.

International Search Report and Written Opinion for PCT Application PCT/US2020/032389, dated Jul. 2, 2020.

International Search Report and Written Opinion for PCT Application PCT/US2020/027032, dated May 28, 2020.

International Search Report and Written Opinion for PCT Application PCT/US2020/039639, dated Sep. 28, 2020.

* cited by examiner

METHOD AND SYSTEM FOR GENERATING FUELING INSTRUCTIONS FOR A VEHICLE

CROSS REFERENCES TO RELATED APPLICATIONS

The Present Application claims priority to U.S. Provisional Patent Application No. 62/867,845, filed on Jun. 27, 2019, and the Present Application is also a continuation-in-part application of U.S. patent application Ser. No. 16/870,955, filed on May 9, 2020, which is a continuation-in-part application of U.S. patent application Ser. No. 16/416,396, filed on May 20, 2019, now U.S. Pat. No. 10,652,935, issued on May 12, 2020, which is a continuation-in-part application of U.S. patent application Ser. No. 16/118,436, filed on Aug. 31, 2018, now U.S. Pat. No. 10,334,638, issued on Jun. 25, 2019, which is a continuation application of U.S. patent application Ser. No. 15/917,633, filed on Mar. 11, 2018, now U.S. Pat. No. 10,070,471, issued on Sep. 4, 2018, which is a continuation application of U.S. patent application Ser. No. 15/624,814, filed on Jun. 16, 2017, now U.S. Pat. No. 9,961,710, issued on May 1, 2018, which claims priority to U.S. Provisional Patent Application No. 62/352,014, filed on Jun. 19, 2016, and the Present Application is a continuation-in-part application of U.S. patent application Ser. No. 16/664,906, filed on Oct. 27, 2019, which is a continuation application of U.S. patent application Ser. No. 15/859,380, filed on Dec. 30, 2017, now U.S. Pat. No. 10,475,258, issued on Nov. 12, 2019, which is a continuation-in-part application of U.S. patent application Ser. No. 15/624,814, filed Jun. 16, 2017, now U.S. Pat. No. 9,961,710, issued on May 1, 2018, which claims priority to U.S. Provisional Patent Application No. 62/352,014, filed on Jun. 19, 2016, and U.S. patent application Ser. No. 15/859,380 claims priority to U.S. Provisional Patent Application No. 62/441,290, filed on Dec. 31, 2016, U.S. Provisional Patent Application No. 62/441,298, filed on Dec. 31, 2016, and U.S. Provisional Patent Application No. 62/441,315, filed on Dec. 31, 2016, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to remote instructions for a vehicle.

Description of the Related Art

The prior art discusses various techniques for wireless networks for vehicles.

U.S. Pat. No. 9,215,590 for Authentication Using Vehicle Data Pairing discloses the wireless pairing of a portable device with an on-board computer of a vehicle for authenticating a transaction with a third party.

General definitions for terms utilized in the pertinent art are set forth below.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

FTP or File Transfer Protocol is a protocol for moving files over the Internet from one computer to another.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Memory generally includes any type of integrated circuit or storage device configured for storing digital data including without limitation ROM, PROM, EEPROM, DRAM, SDRAM, SRAM, flash memory, and the like.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Processor generally includes all types of processors including without limitation microprocessors, general purpose processors, gate arrays, array processors, application specific integrated circuits (ASICs) and digital signal processors.

SCP (Secure Connection Packet) is used to provide authentication between multiple devices or a local party and remote host to allow for secure communication or the transfer of computer files.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

There is a need for informing a vehicle such as a truck, where and when to refuel during a delivery.

BRIEF SUMMARY OF THE INVENTION

The present invention provides a system and method instructing a vehicle where and when to refuel.

One aspect of the present invention is a method for instructing a vehicle where and when to refuel. The method includes receiving at a server a workflow for a vehicle. The workflow comprises an origination location of the vehicle, a destination of the vehicle, a route to the destination, a cargo, a time of departure and a time of arrival. The method also includes receiving at the server a real-time driver profile for the driver of the vehicle. The method also includes receiving at the server real-time data for the vehicle from a CVD connected to on board diagnostics for the vehicle. The method also includes receiving at the server a configuration of the vehicle. The method also includes receiving at the server a plurality of dynamic compliance rules. The method also includes receiving at the server a plurality of configurable real-time vehicle data trigger events. The method also includes determining at the server a real-time GPS location for the vehicle. The method also includes determining at the server a plurality of fuel stops along the route. The method also includes calculating a fuel stop from the plurality of fuel stops for the vehicle based on the workflow, the real-time driver profile, the configuration of the vehicle, the real-time GPS location of the vehicle, the real-time vehicle data, the plurality of dynamic compliance rules, and the selected fuel station profile. The method also includes transmitting to the vehicle guidance to the selected fuel stop from the current location of the vehicle, wherein the guidance includes micro-navigation to an exact fuel pump of the fuel stop for fueling during a predetermined fueling time period.

Another aspect of the present invention is a method for instructing a vehicle where and when to refuel. The method includes determining a real-time GPS location for a vehicle. The method also includes determining a plurality of fuel stops along a route for the vehicle. The method also includes calculating a fuel stop from the plurality of fuel stops for the vehicle based on a workflow, a real-time driver profile, a configuration of the vehicle, the real-time GPS location of the vehicle, real-time vehicle data, a plurality of dynamic compliance rules, and a selected fuel stop profile. The method also includes transmitting to the vehicle guidance to the selected fuel stop from the current location of the vehicle, wherein the guidance includes micro-navigation to an exact fuel pump of the fuel stop for fueling during a predetermined time period.

Yet another aspect of the present invention a non-transitory computer-readable medium that stores a program that causes a processor to perform functions for instructing a vehicle where and when to refuel. The functions include determining a real-time GPS location for a vehicle. The functions also include determining a plurality of fuel stops along a route for the vehicle. The functions also include calculating a fuel stop from the plurality of fuel stops for the vehicle based on a workflow, a real-time driver profile, a configuration of the vehicle, the real-time GPS location of the vehicle, real-time vehicle data, a plurality of dynamic compliance rules, and a selected fuel stop profile. The functions also include transmitting to the vehicle guidance to the selected fuel stop from the current location of the vehicle, wherein the guidance includes micro-navigation to an exact fuel pump of the fuel stop for fueling during a predetermined time period.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
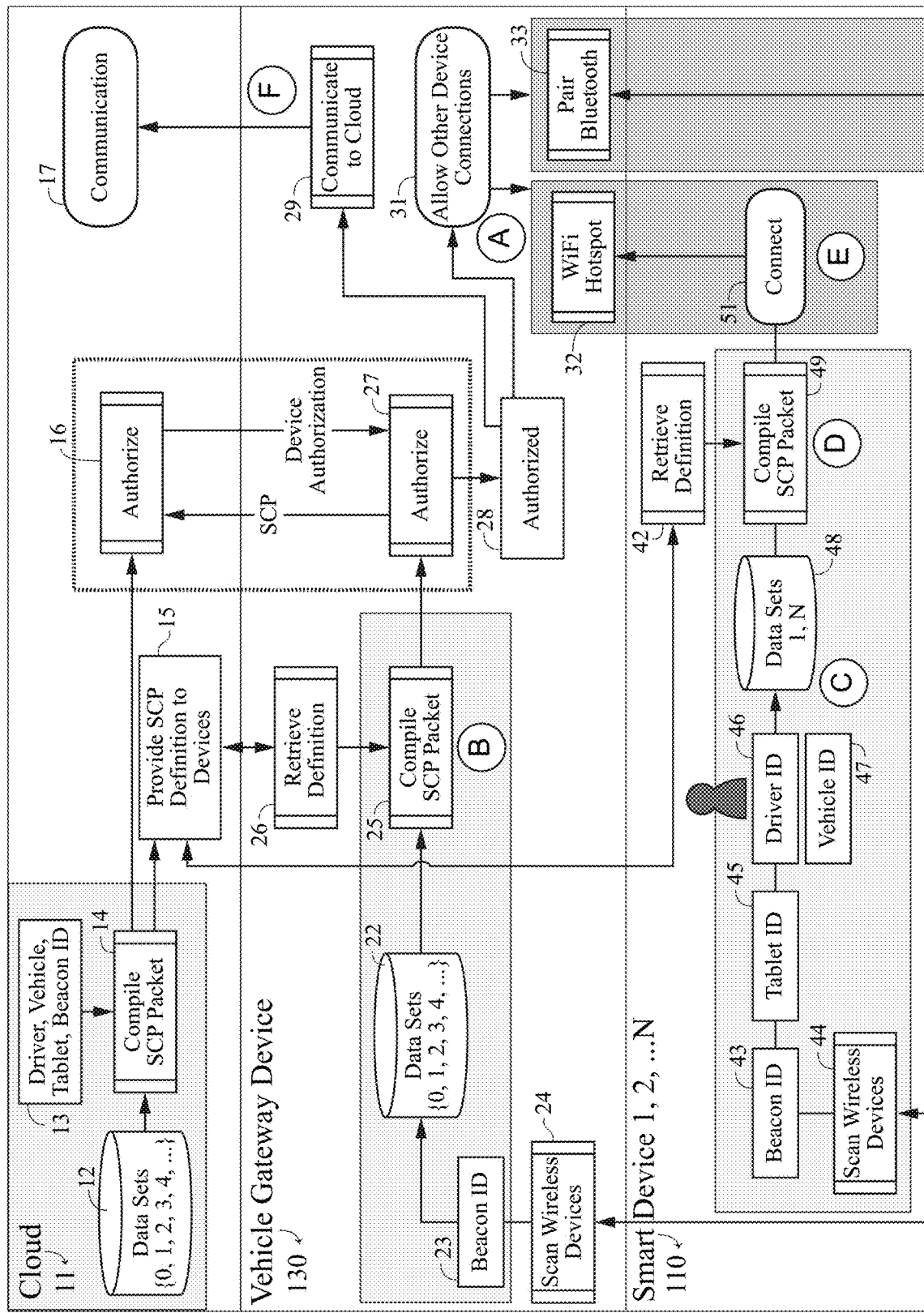
FIG. 1 is a block diagram of system for a secure communication protocol for connecting a wireless device to a single access point in a vehicle.

A first embodiment is a method for instructing a vehicle where and when to refuel. The method includes receiving at a server a workflow for a vehicle. The workflow comprises an origination location of the vehicle, a destination of the vehicle, a route to the destination, a cargo, a time of departure and a time of arrival. The method also includes receiving at the server a real-time driver profile for the driver of the vehicle. The method also includes receiving at the server real-time data for the vehicle from a CVD connected to on board diagnostics for the vehicle. The method also includes receiving at the server a configuration of the vehicle. The method also includes receiving at the server a plurality of dynamic compliance rules. The method also includes receiving at the server a plurality of configurable real-time vehicle data trigger events. The method also includes determining at the server a real-time GPS location for the vehicle. The method also includes determining at the server a plurality of fuel stops along the route. The method also includes calculating a fuel stop from the plurality of fuel stops for the vehicle based on the workflow, the real-time driver profile, the configuration of the vehicle, the real-time GPS location of the vehicle, the real-time vehicle data, the plurality of dynamic compliance rules, and the selected fuel station profile. The method also includes transmitting to the vehicle guidance to the selected fuel stop from the current location of the vehicle, wherein the guidance includes micro-navigation to an exact fuel pump of the fuel stop for fueling during a predetermined fueling time period.

A second embodiment is a method for instructing a vehicle where and when to refuel. The method includes determining a real-time GPS location for a vehicle. The method also includes determining at least one fuel stop along a route for the vehicle. The method also includes calculating the distance and time to the fuel stop for the vehicle based on a workflow, a real-time driver profile, a configuration of the vehicle, the real-time GPS location of the vehicle, real-time vehicle data, a plurality of dynamic compliance rules, and a selected fuel stop profile. The method also includes transmitting to the vehicle guidance to the selected fuel stop from the current location of the vehicle, wherein the guidance includes micro-navigation to an exact fuel pump of the fuel stop for fueling during a predetermined time period.

A third embodiment is a non-transitory computer-readable medium that stores a program that causes a processor to perform functions for instructing a vehicle where and when to refuel. The functions include determining a real-time GPS location for a vehicle. The functions also include determining a plurality of fuel stops along a route for the vehicle. The functions also include calculating a best fuel stop from the plurality of fuel stops for the vehicle based on a workflow, a real-time driver profile, a configuration of the vehicle, the real-time GPS location of the vehicle, real-time vehicle data, a plurality of dynamic compliance rules, and a selected fuel stop profile. The functions also include transmitting to the vehicle guidance to the selected fuel stop from the current location of the vehicle, wherein the guidance includes micro-navigation to an exact fuel pump of the fuel stop for fueling during a predetermined time period.

The real-time data for the vehicle comprises a real-time speed of the vehicle, tire pressure values from a plurality of tire sensors, refrigeration/HVAC unit values, a plurality of fluid levels, a plurality of power unit values, a real-time fuel tank capacity, and a fuel type.

The plurality of configurable real-time vehicle data trigger events comprises a value outside of a predetermined range for the real-time data of the vehicle.

The method also automatically bills an off-site entity for the fuel pumped by the vehicle at the fuel stop.

The real-time driver/operator profile comprises amount of time driving during a pre-determined time period, number of rest breaks during the pre-determined time period, license compliance data, physical disabilities and driving violations.

The profile of the fuel stop preferably comprises real-time types of fuels available, set billing instructions, physical dimensions of a plurality of fuel pumps, GPS coordinates, hours of operation, food service availability, and resting area availability.

The configuration of the vehicle is selected from one of a single trailer, a dual trailer, a triple trailer, and a refrigeration trailer.

The predetermined fueling time period is a time range to fuel the vehicle based on the real-time GPS location of the vehicle, the real-time speed of the vehicle, the distance to the selected fuel stop from the real-time GPS location of the vehicle, and the hours of operation of the fuel stop.

The dynamic compliance rules comprise speed limits, transport of toxic waste, the transport of refrigerated cargo, the rest durations for drivers/operators, the necessary insurance coverage, and the type of taxes and fees to be paid.

The workflow preferably comprises an origination location of the vehicle, a destination of the vehicle, a route to the destination, a cargo, a time of departure and a time of arrival.

Figure 1A:
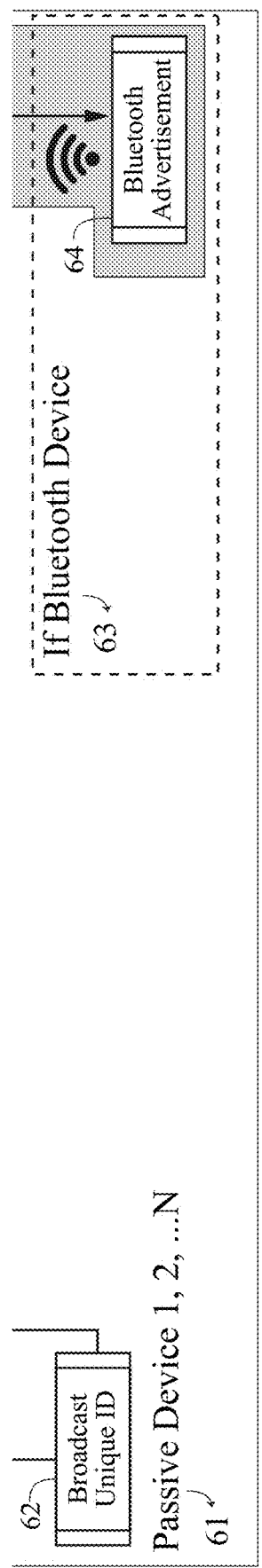
FIG. 1A is a continuation of the block diagram of FIG. 1.

A system 10 for securely connecting a wireless device to a single access point in a vehicle for a predetermined work assignment is set for the FIGS. 1 and 1A. The system 10 preferably comprises a remote server (cloud) 11, a vehicle gateway device 130, a smart device 110 and a passive device 61. The vehicle gateway device 130 is preferably a connected vehicle device ("CVD").

The server/cloud 11 accesses dataset 12 and obtains driver information. Vehicle information, mobile device information (MAC address), passive device information (beacon ID) and other information to compile a SCP packet 14. At block 15, the server 11 provides SCP definitions to the vehicle gateway device 130 and the mobile device 110. At block 16 the server/cloud 11 authorizes the SCP. At block 17, the server/cloud 11 communicates with the vehicle gateway device 130.

The vehicle gateway device 130 uses datasets 22, with the beacon ID 23, a scan of wireless devices 24 along with the SCP definitions 26 received from the server/cloud 11 to compile a CVD compiled SCP packet 25. The CVD compiled SCP packet is sent to the cloud/server 11 at block 16 and authorization/validation of the CVD compiled SCP packet is received at block 27. At block 28 the SCP is authorized for broadcasting at the vehicle gateway device 130 a wireless network with a hidden and hashed SSID unique to the vehicle, the hidden and hashed SSID generated from the validated SCP packet. At block 29, the vehicle gateway device 130 communicates the broadcast with the server/cloud 11. At block 31, the vehicle gateway device 130 communicates with other devices, namely the smart device 110 over preferably a WiFi hotspot 32 and the passive device 61 by pairing using a BLUETOOTH communication protocol at block 33.

At block 49, the smart device (mobile device) 110 compiles a complied mobile device SCP packet from the SCP definitions 42, the data sets 48, the beacon ID 43, the Tablet ID 45, a driver ID 46, a vehicle ID 47 and scan of wireless devices 44. The mobile device 110 generates the hashed SSID and a passphrase from the complied mobile device SCP packet. At block 51, the mobile device 110 connects to the WiFi hotspot 32 of the vehicle device gateway 130.

The passive device 61 broadcast a unique ID at block 62 which is received by the mobile device 110 and the vehicle gateway device 130. At block 63, if a BLUETOOTH device, it broadcasts a BLUETOOTH advertisement at block 64.

The SCP is defined by an assigning authority in the server/cloud 11. The server/cloud 11 sends the SCP definition and any other required data in datasets to the CVD 130 and the mobile device 110. The CVD 130 adds the contextual data from local datasets to the sever-sent data to compile its SCP based definition. The local datasets include data wirelessly scanned from passive devices, preferably transmitting a BLUETOOTH beacon. Other local datasets include information from the vehicle. The CVD 130 sends its compiled SCP packet to the server 11 for authorization. The server 11 verifies the CVD compiled SCP packet, and if valid, the server 11 transmits a validation/approval signal to the CVD 130. The CVD then generates an access point SSID/passphrase with SCP. Likewise, the mobile device 110 utilizes contextual data from local datasets to compile its SCP based on the definitions. The mobile device 110 connects to the access point of the CVD 130 using the SCP. The CVD 130 and the mobile device 110 also connect to the passive device 61 since it is part of the SCP definition.

A predetermined work assignment is a temporal event with a fixed start and completion based on assignable boundary conditions. The assignable boundary condition is at least one of a predetermined time period, a geographical destination, and a set route. Alternatively, the assignable boundary condition is any feature with a beginning and a termination. The assigning authority is performed by a person or persons, who have the appropriate authority and mechanisms to assign specific tasks and assets to a specific vehicle and vehicle operator or custodian, and to assign workflow assignments to the same. The predetermined work assignment is assigned to a known person or entity that has its own primary networked device accessible through a password protected user interface, a specific name and password that auto-populates or otherwise automatically satisfies a plurality of credentials requirements, wherein the plurality of credential requirements are automatically available or revoked based on the assignable boundary condition identified in a patting event.

The CVD 130 broadcasts a Wifi wireless network with a hidden and hashed SSID unique to the host vehicle and protected by a unique, dynamically generated and hashed passphrase. The vehicle ID is entered into an application on the tablet that is then converted to the same hashed SSID and passphrase, which allows the tablet to attempt to connect to the corresponding CVD Wifi network and begin communication.

Figure 2:
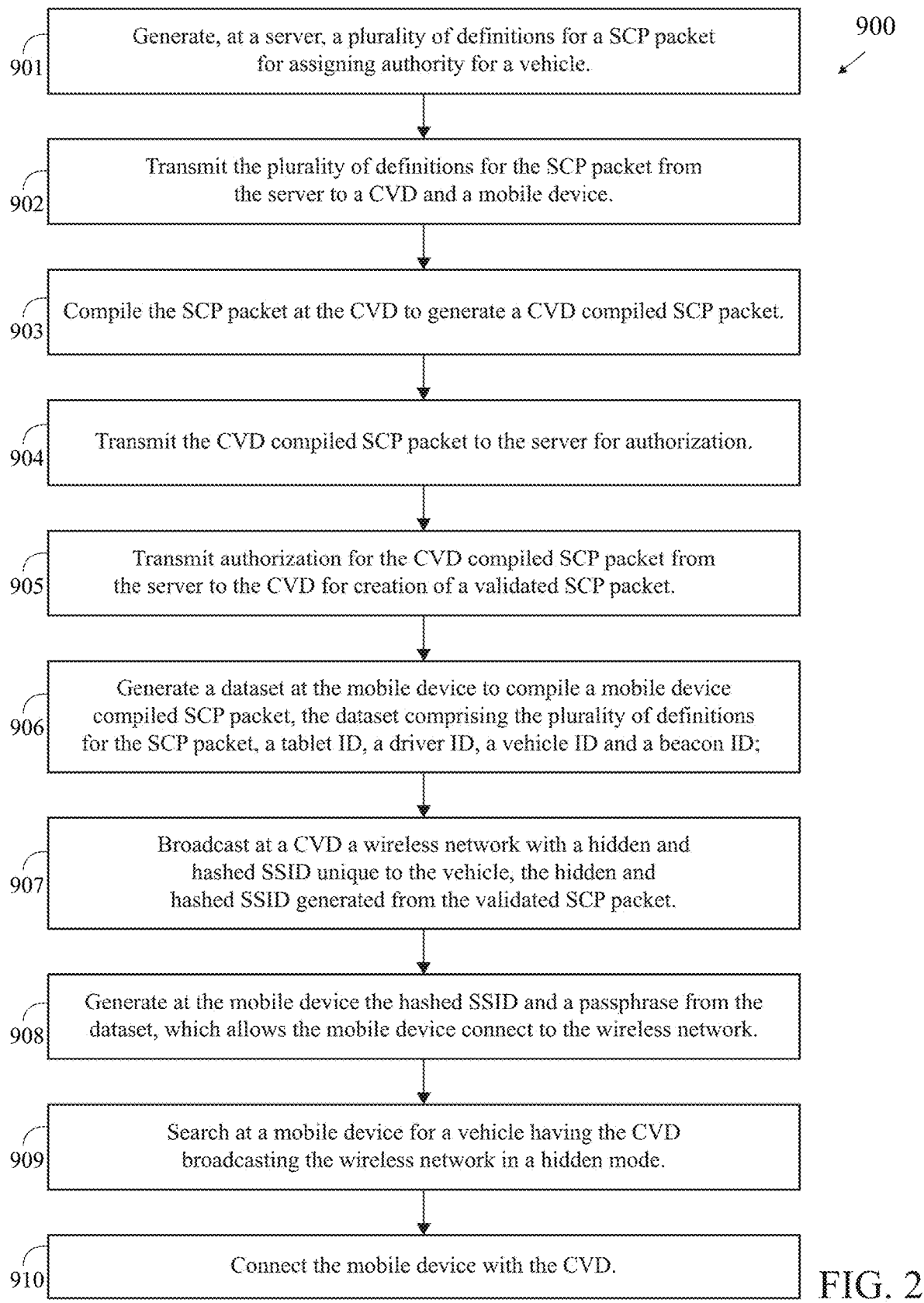
FIG. 2 is a flow chart of a method for a secure connection to a wireless network of a vehicle.

A method 900 for a secure connection to a wireless network of a vehicle is shown in FIG. 2. At block 901, a server generates definitions for a SCP packet for assigning authority for a vehicle. At block 902 the server transmits the definitions for the SCP packet to a CVD and a mobile device. At block 903, the CVD compiles the SCP packet to generate a CVD compiled SCP. At block 904, the CVD transmits the CVD compiled SCP to the server for authorization. At block 905, the server transmits authorization for the CVD compiled SCP from to the CVD for creation of a validated SCP. At block 906, the mobile device generates a dataset to compile a mobile device compiled SCP. At block 907, the CVD broadcasts at a wireless network with a hidden and hashed SSID unique to the vehicle. The hidden and hashed SSID is generated from the validated SCP packet. At block 908, the mobile device generates the hashed SSID and a passphrase from the dataset, which allows the mobile device connect to the wireless network. At block 909, the mobile device searches for a vehicle having the CVD broadcasting the wireless network in a hidden mode. At block 910, the mobile device securely connects with the CVD.

One embodiment utilizes a system for vehicle to mobile device secure wireless communications. The system comprises a vehicle 210, a CVD 130, a mobile device 110 and a passive communication device 61. The vehicle 210 comprises an on-board computer with a memory having a vehicle identification number (VIN), a connector plug, and an motorized engine. The CVD 130 comprises a processor, a WiFi radio, a BLUETOOTH radio, a memory, and a connector for mating with the connector plug of the vehicle. The mobile device 110 comprises a graphical user interface, a mobile application, a processor, a WiFi radio, and a cellular network interface. The passive communication device 61 operates on a BLUETOOTH communication protocol. The server 11 is configured to generate a plurality of definitions for a SCP packet for assigning authority for the vehicle. The server 11 is configured to transmit the plurality of definitions for the SCP packet from the server to the CVD 130 and the mobile device 110. The CVD 130 is configured to compile the SCP packet to generate a CVD compiled SCP. The CVD 130 is configured to transmit the CVD compiled SCP to the server 11 for authorization. The server 11 is configured to transmit authorization for the CVD compiled SCP to the CVD 130 for creation of a validated SCP. The mobile device 110 is configured to generating a dataset to compile a mobile device compiled SCP. The CVD 130 is configured to broadcast a wireless network with a hidden and hashed SSID unique to the vehicle, the hidden and hashed SSID generated from the validated SCP packet. The mobile device 110 is configured to generate the hashed SSID and a passphrase from the dataset, which allows the mobile device connect to the wireless network. The mobile device 110 is configured to search for a vehicle having the CVD broadcasting the wireless network in a hidden mode. The mobile device 110 is configured to connect to the CVD 130 over the wireless network.

The dataset preferably comprises at least one of a plurality of definitions for the SCP packet, a tablet ID, a driver ID, a vehicle ID, a beacon ID, identified or defined entity/participant to the transaction, descriptions, actions, or states of thing, characteristics of identifiable devices, when present in a certain proximity and/or context.

Optionally, the mobile device 110 connects to a passive device, the passive device operating on a BLUETOOTH communication protocol. The passive device 61 is preferably a BLUETOOTH enabled device advertising a unique ID as a beacon or a complex system (speaker, computer, etc.) that emits BLUETOOTH enabled device advertising a unique ID as a beacon.

The mobile device 110 preferably receives input from a driver of the vehicle, and/or the server 11 contains the assigning authority that generates the SCP definitions.

The passive device 61 is preferably an internal device in the vehicle or an external device posted on a gate to a facility and generating a beacon. The beacon from the passive device is preferably a mechanism to ensure that the connection between the mobile device 110 and the CVD 130 occurs at a specific physical location dictated by the assigning authority through the server 11. Preferably, the automatic connection between the mobile device 110 and the CVD occurs because the assigning authority, through the server, has dictated that it occur.

Figure 3:
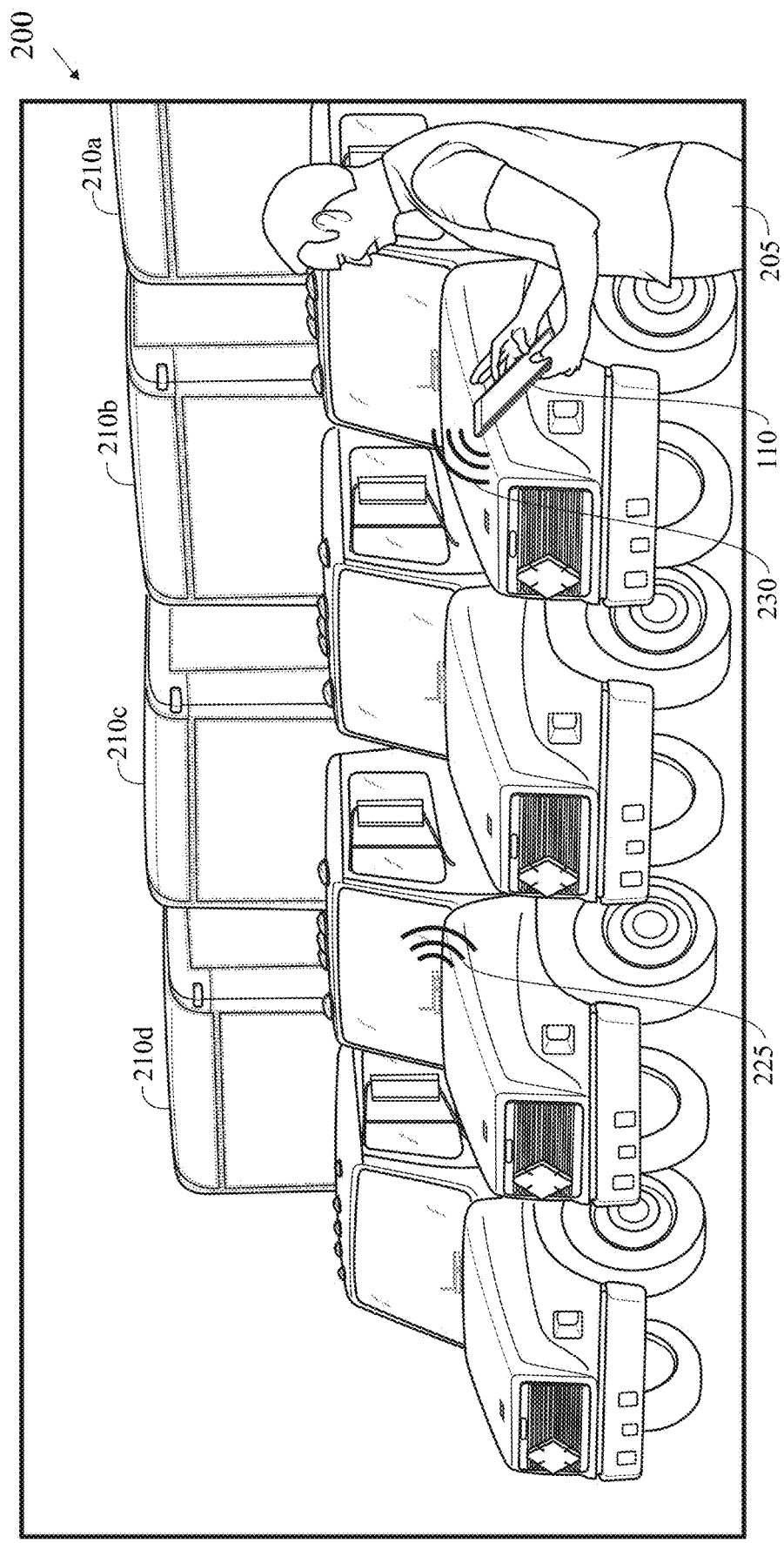
FIG. 3 is an illustration of a driver identifying a vehicle through connection of a tablet computer to an unpublished network.

As shown in FIG. 3, each of a multitude of trucks 210*a*-210*d* broadcast a wireless signal for a truck specific network, with one truck 210*c* broadcasting a wireless signal 225. However, the SSID is not published so unless a driver is already in possession of the SSID, the driver will not be able to pair the tablet computer 110 with the CVD 130 of the truck 210 to which the driver is assigned. So even though the wireless signals are being "broadcast", they will not appear on a driver's tablet computer 110 (or other mobile device) unless the tablet computer 110 has already been paired with the CVD 130 of the vehicle 210. A driver 205 in possession of a tablet computer 110 pairs, using a signal 230, the tablet computer 110 with the wireless network 225 of the CVD of the truck 210*c*, and thus the driver locates the specific truck 210*c* he is assigned to in a parking lot full of identical looking trucks 210*a-d*.

For example, on an IPHONE® device from Apple, Inc., the "UDID," or Unique Device Identifier is a combination of forty numbers and letters, and is set by Apple and stays with the device forever.

For example, on an ANDROID based system, one that uses Google Inc.'s ANDROID operating system, the ID is set by Google and created when an end-user first boots up the device. The ID remains the same unless the user does a "factory reset" of the phone, which deletes the phone's data and settings.

The mobile communication device 110, or mobile device, is preferably selected from mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet computer from Apple Inc., and the XOOM™ tablet computer from Motorola Mobility Inc.

The mobile communication device 110 then a communication network utilized preferably originates from a mobile communication service provider (aka phone carrier) of the customer such as VERIZON, AT&T, SPRINT, T-MOBILE, and the like mobile communication service providers, provide the communication network for communication to the mobile communication device of the end user.

Wireless standards utilized include 802.11a, 802.11b, 802.11g, AX.25, 3G, CDPD, CDMA, GSM, GPRS, radio, microwave, laser, Bluetooth, 802.15, 802.16, and IrDA.

BLUETOOTH™ technology operates in the unlicensed 2.4 GHz band of the radio-frequency spectrum, and in a preferred embodiment the secondary device 30 and/or primary device 25 is capable of receiving and transmitting signals using BLUETOOTH™ technology. LTE Frequency Bands include 698-798 MHz (Band 12, 13, 14, 17); 791-960 MHz (Band 5, 6, 8, 18, 19, 20); 1710-2170 MHz (Band 1, 2, 3, 4, 9, 10, 23, 25, 33, 34, 35, 36, 37, 39); 1427-1660.5 MH (Band 11, 21, 24); 2300-2700 MHz (Band 7, 38, 40, 41); 3400-3800 MHz (Band 22, 42, 43), and in a preferred embodiment the secondary device 30 and/or the primary device 25 is capable of receiving and transmitting signals using one or more of the LTE frequency bands. WiFi preferably operates using 802.11a, 802.11b, 802.11g, 802.11n communication formats as set for the by the IEEE, and in a preferred embodiment the secondary device 30 and/or the primary device 25 is capable of receiving and transmitting signals using one or more of the 802.11 communication formats. Near-field communications (NFC) may also be utilized.

Figure 4:
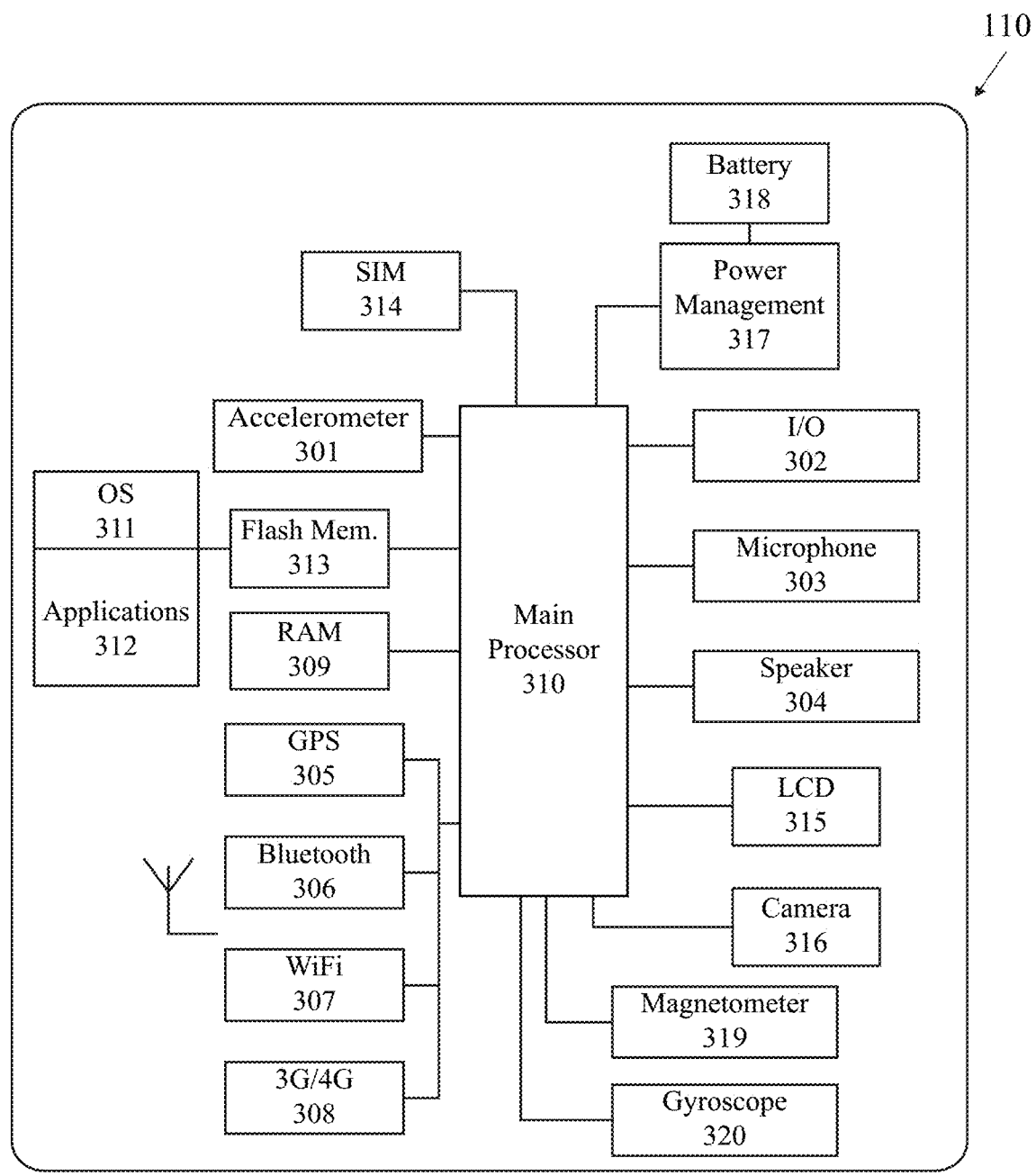
FIG. 4 is an isolated view of general electrical components of a mobile communication device.

As shown in FIG. 4, a typical mobile communication device 110 preferably includes an accelerometer 301, I/O (input/output) 302, a microphone 303, a speaker 304, a GPS chipset 305, a Bluetooth component 306, a Wi-Fi component 307, a 3G/4G component 308, RAM memory 309, a main processor 310, an OS (operating system) 311, applications/software 312, a Flash memory 313, SIM card 314, LCD display 315, a camera 316, a power management circuit 317, a battery 318 or power source, a magnetometer 319, and a gyroscope 320.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. Databases that may be used with the system preferably include but are not limited to MSSQL, Access, MySQL, Progress, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at the cloud server 11, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the authentication server 40 is most preferably HTTPS.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Figure 5:
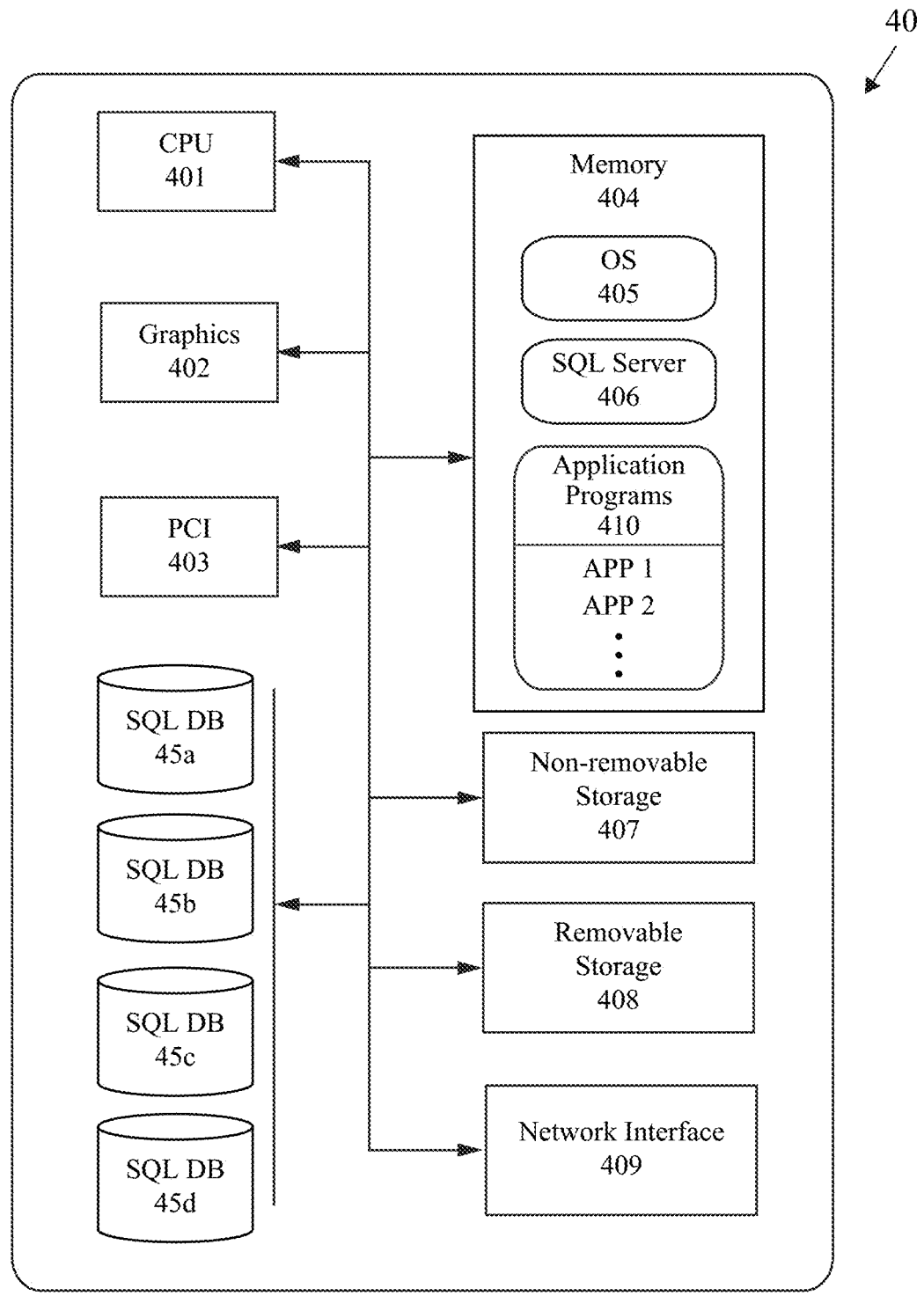
FIG. 5 is an isolated view of general electrical components of a server.

Components of a cloud computing server 40 of the system, as shown in FIG. 5, preferably includes a CPU component 401, a graphics component 402, PCI/PCI Express 403, memory 404, non-removable storage 407, removable storage 408, Network Interface 409, including one or more connections to a fixed network, and SQL database(s) 45a-45d, which includes the venue's CRM. Included in the memory 404, is an operating system 405, a SQL server 406 or other database engine, and computer programs/software 410. The server 40 also preferably includes at least one computer program configured to receive data uploads and store the data uploads in the SQL database. Alternatively, the SQL server can be installed in a separate server from the server 40.

Figure 6:
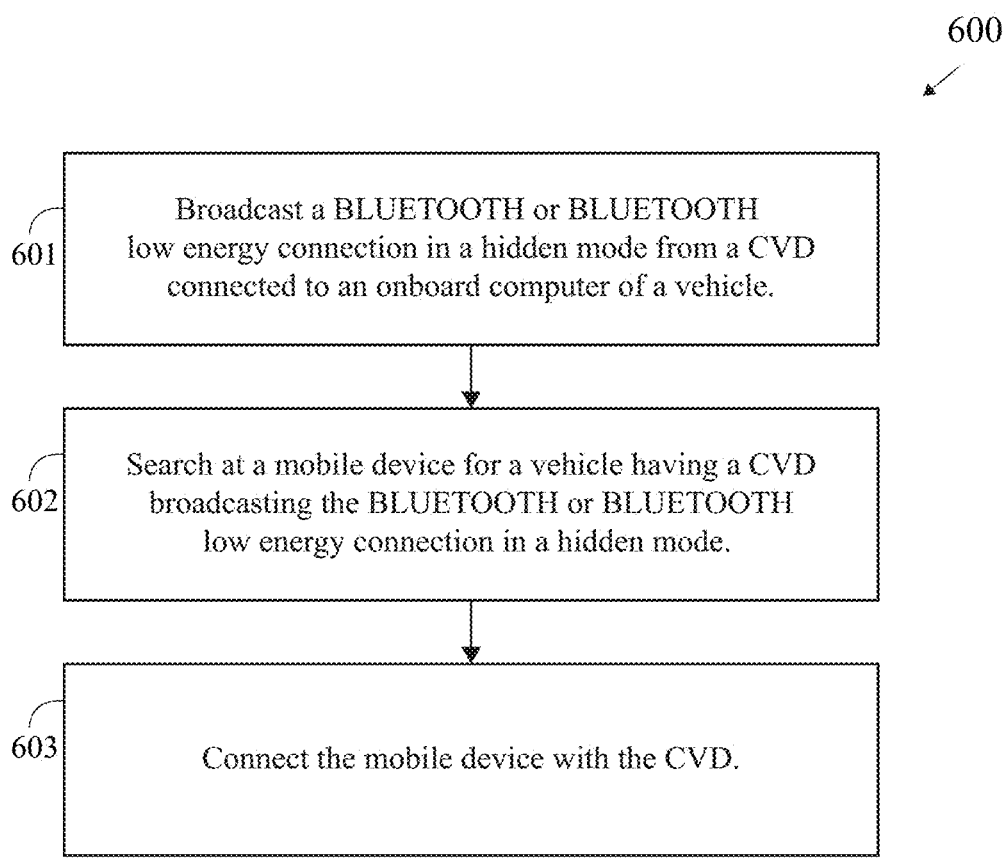
FIG. 6 is a flow chart of method for securely connecting a wireless device to a single access point in a vehicle.

A flow chart for an alternative method 600 for a secure connection to a wireless network of a vehicle is shown in FIG. 6. At block 601, the CVD broadcasts an encrypted, blind SSID based on specific vehicle data. At block 602, leveraging the known vehicle data and the encryption algorithm a mobile device searches for a vehicle having a CVD broadcasting the wireless network. At block 603, the mobile device is connected with the CVD.

Figure 7:
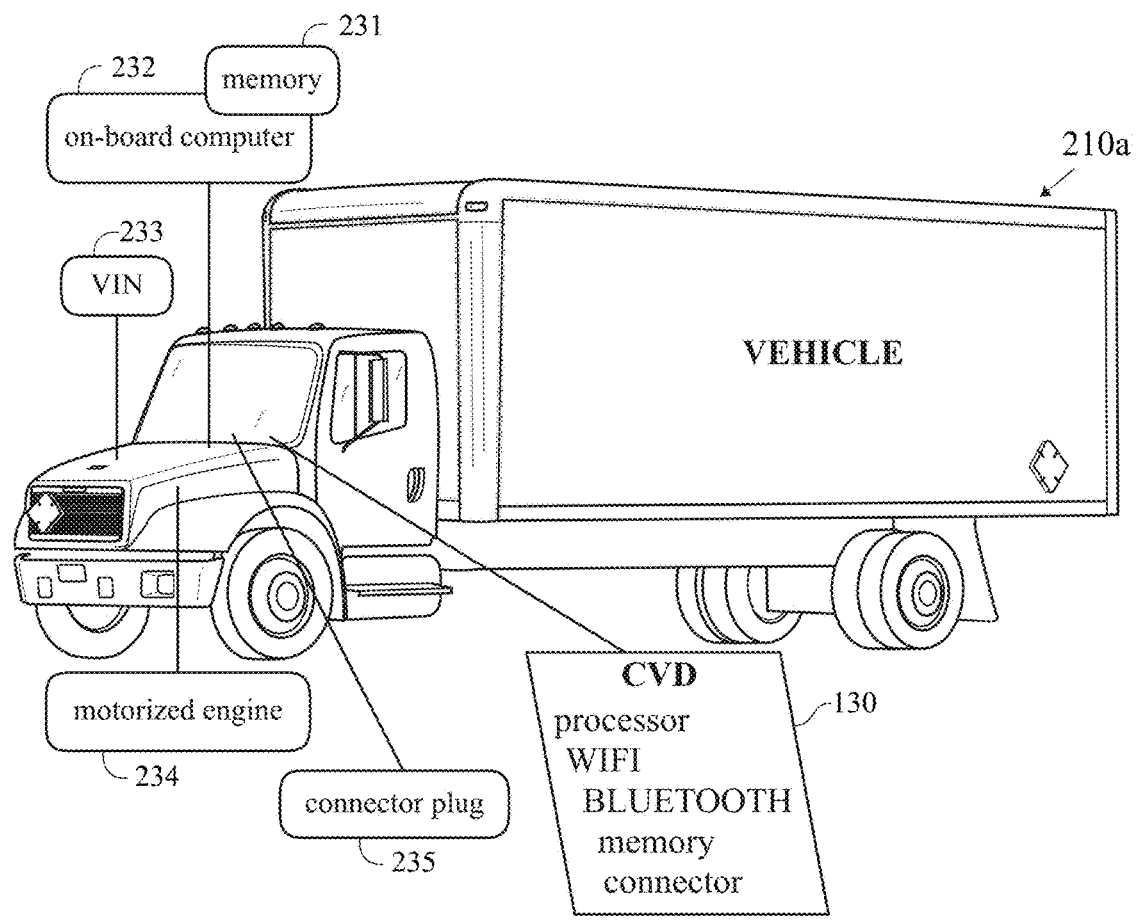
FIG. 7 is an illustration of a system for securely connecting a wireless device to a single access point in a vehicle.
Figure 7:
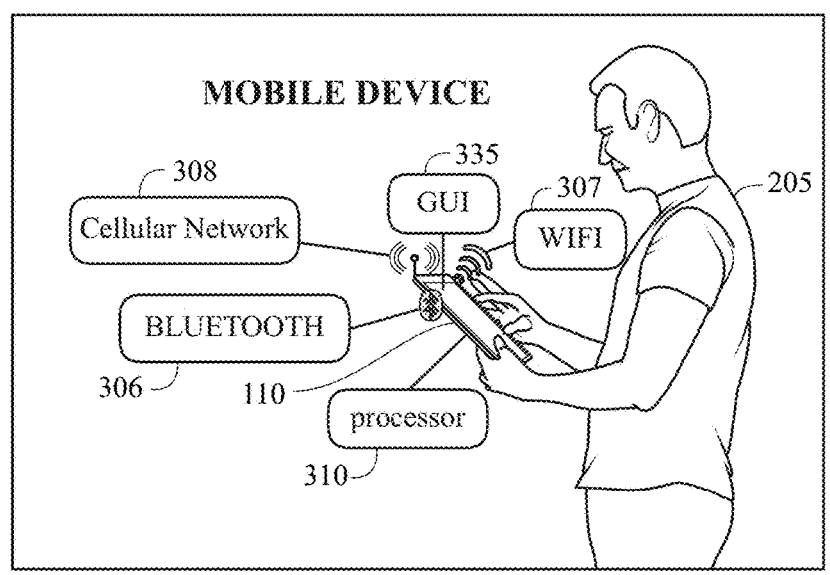

A system for a secure connection to a wireless network of a vehicle is shown in FIG. 7. A truck 210a. Those skilled in the pertinent art will recognize that the truck 210a may be replaced by any type of vehicle (such as a bus, sedan, pick-up, sport utility vehicle, limousine, sports car, delivery truck, van, mini-van, motorcycle, and the like) without departing from the scope of spirit of the present invention. The truck 210a preferably comprises a motorized engine 234, a vehicle identification number ("VIN"), an on-board computer 232 with a memory 231 and a connector plug 235. The on-board computer 232 preferably has a digital copy of the VIN in the memory 231. The on-board computer 232 is preferably in communication with the motorized engine 234. The truck 210a may also have a GPS component for location and navigation purposes, a satellite radio such as SIRIUS satellite radio, a driver graphical interface display, a battery, a source of fuel and other components found in a conventional long distance truck.

Also in the truck 210a is a CVD 130 comprising a processor, a WiFi radio, a BLUETOOTH radio, a memory and a connector to connect to the connector plug of the on-board computer 232.

A driver 205 preferably has a mobile communication device such as a tablet computer 110 in order to pair with a wireless network generated by the CVD 130 of the truck 210a. The tablet computer 110 preferably comprises a graphical user interface 335, a processor 310, a WiFi radio 307, a BLUETOOTH radio 306, and a cellular network interface 308.

Figure 8:
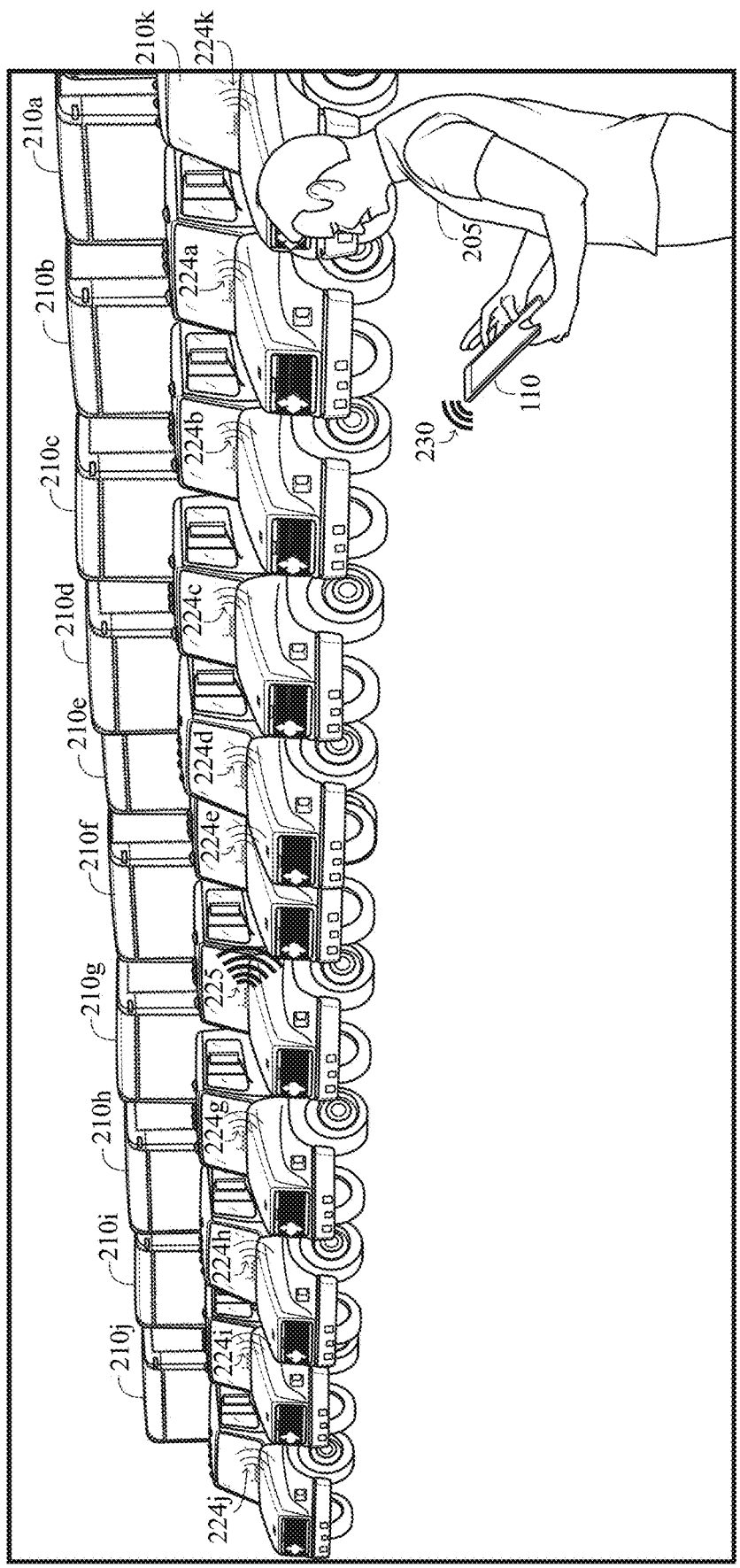
FIG. 8 is an illustration of a driver identifying a vehicle through connection of a tablet computer to an unpublished network.

As shown in FIG. 8, each of a multitude of trucks 210a-210k broadcast a wireless signal 224a-k for a truck specific network, with one truck 210f broadcasting a wireless signal 225. However, all of the wireless signal 224a-224k and 225 do not publish their respective SSID so that a mobile device 110 must already be paired with the CVD 130 of the truck 210 in order to connect to the truck based wireless network 224a-224k or 225 of each of the CVDs 130 of each of the trucks 210a-210k. A driver 205 in possession of a tablet computer 110 pairs with the specific truck wireless network 225 of the CVD 130 of the truck 210f, and thus the driver locates the specific truck 210f he is assigned to in a parking lot full of identical looking trucks 210a-210k.

Figure 9:
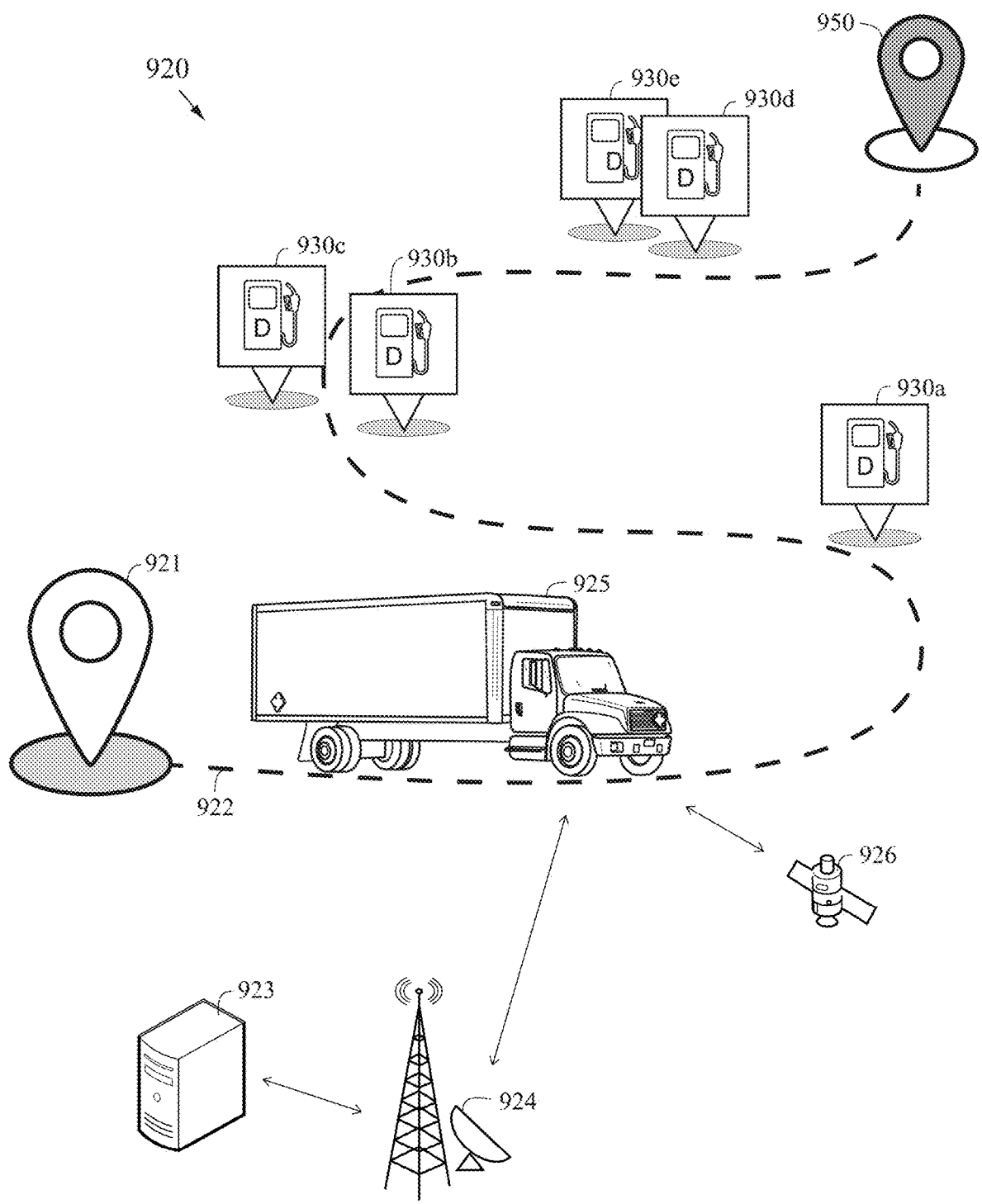
FIG. 9 is a block diagram of a system for instructing a vehicle where and when to refuel.

FIG. 9 is a block diagram of a system 920 for instructing a vehicle 925 where and when to refuel. The vehicle 925 begins at an origination location 901. The vehicle 925 will travel on a route 922 to a destination location 950. Along the route are multiple fuels stops 930a-930e. A GPS satellite 926 provides GPS location information to the vehicle 925. The vehicle 925 is in communication with a server 923 over a communication network 924. The server 923 receives a workflow for a vehicle 925. The workflow comprises an origination location of the vehicle, a destination of the vehicle, a route to the destination, a cargo, a time of departure and a time of arrival. The server 923 calculates a fuel stop for the vehicle 925 based on the workflow, the real-time operator profile, the configuration of the vehicle 925, the real-time GPS location of the vehicle 925 (received from the vehicle), the real-time vehicle data, a dynamic compliance rule, and the selected fuel station profile. The server 925 transmits to the vehicle 925 over the communication network 924 the guidance to the selected fuel stop from the current location of the vehicle 925, The guidance includes micro-navigation to an exact fuel pump contained within the fuel stop location of the fuel stop for fueling during a predetermined fueling time period. The dynamic compliance rules include speed limits, transport of toxic waste, the transport of refrigerated cargo, the rest durations for drivers, the necessary insurance coverage, the type of taxes and fees to be paid, and the like. The server 923 retrieves real-time compliance rules for the location of the truck from the plurality of databases, which are preferably State vehicle databases, municipal vehicle databases, county vehicle databases, and Federal vehicle databases.

Figure 10:
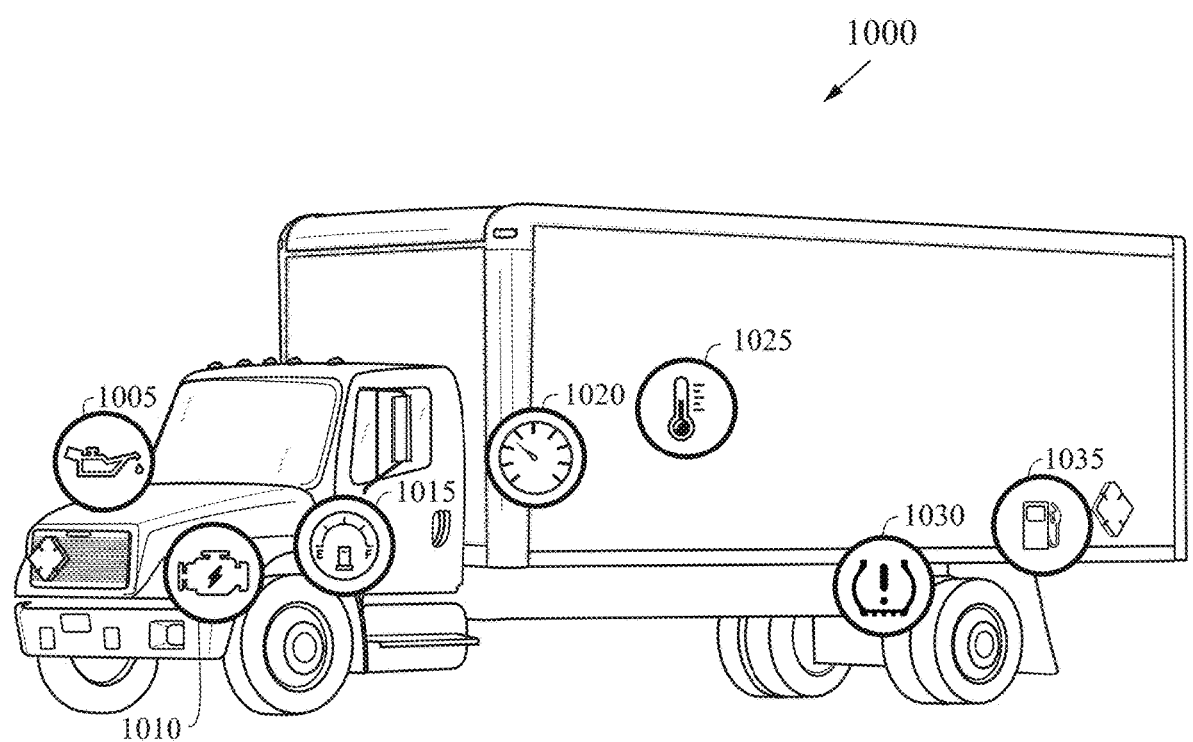
FIG. 10 is an illustration of multiple sensors on a truck.

FIG. 10 is an illustration of multiple sensors on a truck 1000. The vehicle/truck 1000 preferably comprises an oil level sensor 1005, an engine sensor 1010, a power sensor 1015, a refrigeration/HVAC sensor 1020, a temperature sensor 1025, a tire pressure sensor 1030, and a fuel sensor 1035. Those skilled in the pertinent art will recognize that multiple other sensors may be utilized without departing from the scope and spirit of the present invention.

Figure 11:
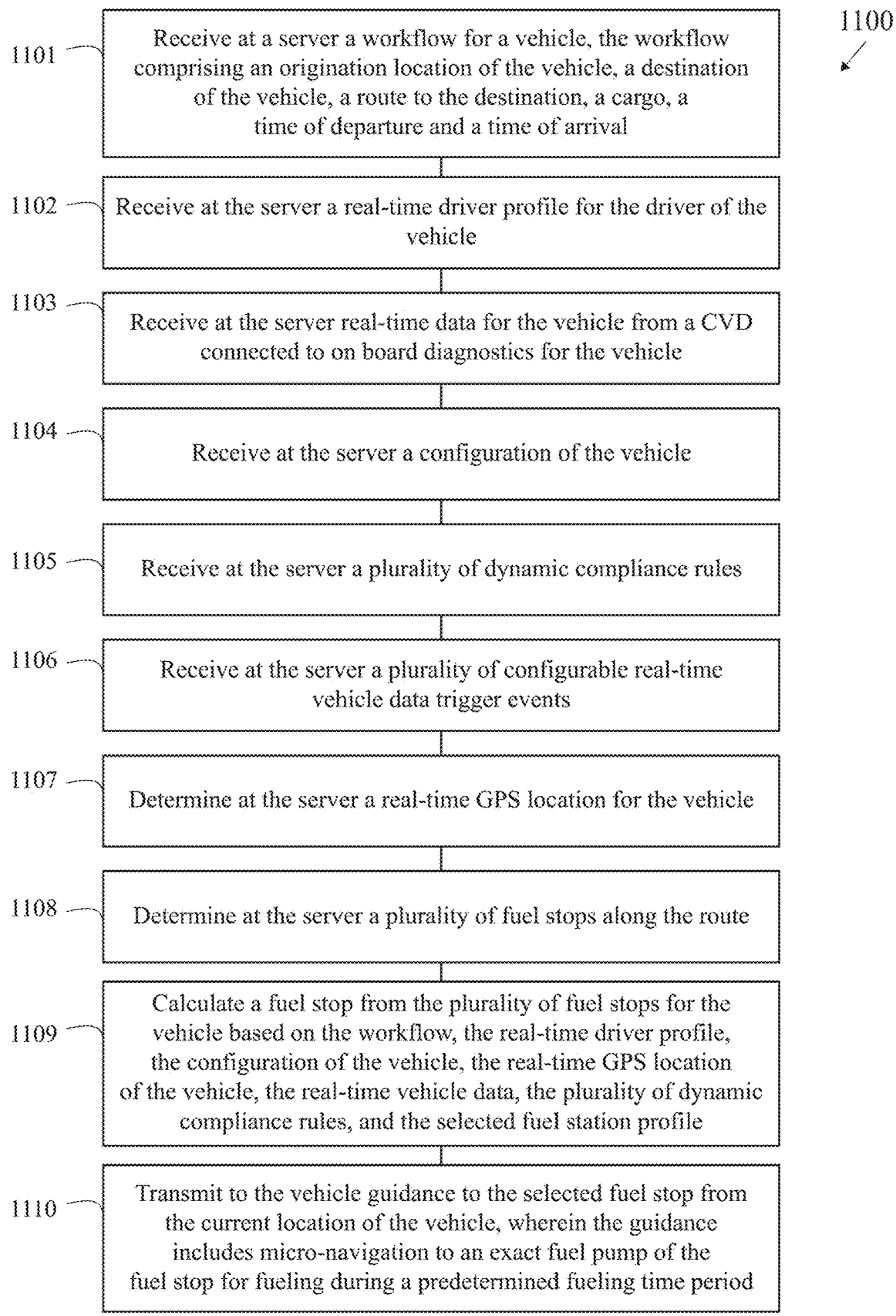
FIG. 11 is a flow chart for a method for instructing a vehicle where and when to refuel.

FIG. 11 is a flow chart for a method 1100 for instructing a vehicle where and when to refuel. At block 1101, a server receives a workflow for a vehicle. The workflow comprises an origination location of the vehicle, a destination of the vehicle, a route to the destination, a cargo, a time of departure and a time of arrival. At block 1102, the server receives a real-time operator profile for the operator of the vehicle. At block 1103, the server receives real-time data for the vehicle from a CVD connected to on board diagnostics for the vehicle. At block 1104, the server receives a configuration of the vehicle. At block 1105, the server receives at least one dynamic compliance rule, and preferably multiple dynamic compliance rules. At block 1106, the server receives at least one configurable real-time vehicle data trigger event. At block 1107, the server utilizes a real-time GPS location for the vehicle. The GPS location is preferably received from the vehicle. At block 1108, the server determines at least one fuel stop along the route, and most preferably multiple fuel stops. At block 1109, the server calculates a fuel stop for the vehicle based on the workflow, the real-time operator profile, the configuration of the vehicle, the real-time GPS location of the vehicle, the real-time vehicle data, dynamic compliance rule, and the selected fuel station profile. At block 1110, the server transmits to the vehicle guidance to the selected fuel stop from the current location of the vehicle, wherein the guidance includes micro-navigation to an exact fuel pump contained within the fuel stop location of the fuel stop for fueling during a predetermined fueling time period.

Figure 12:
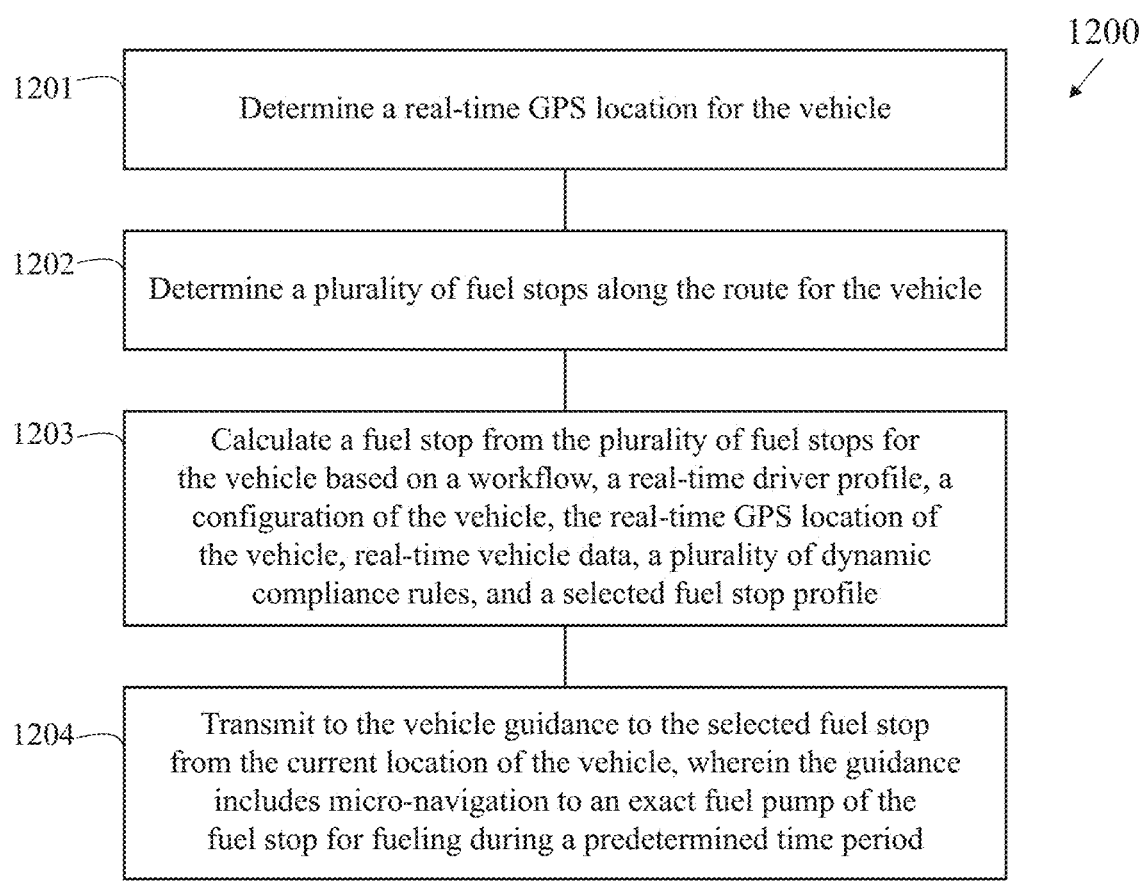
FIG. 12 is a flow chart for a method for instructing a vehicle where and when to refuel.

FIG. 12 is a flow chart for a method 1200 for instructing a vehicle where and when to refuel. At block 1201, a real-time GPS location for a vehicle is determined. At block 1202, at least one fuel stop along a route for the vehicle is determined, and preferably multiple fuel stops are determined. At block 1203, a fuel stop is calculated for the vehicle based on a workflow, a real-time operator profile, a configuration of the vehicle, the real-time GPS location of the vehicle, real-time vehicle data, at least one dynamic compliance rule, and a selected fuel stop profile. At block 1204, guidance to the selected fuel stop from the current location of the vehicle is transmitted to the vehicle, wherein the guidance includes micro-navigation to an exact fuel pump contained within the fuel stop location of the fuel stop for fueling during a predetermined time period.

Kennedy, et al., U.S. patent application Ser. No. 16/450,959, filed on Jun. 24, 2019 for Secure Wireless Networks For Vehicles, is hereby incorporated by reference in its entirety.

Son et al., U.S. Pat. No. 10,475,258 for a Method And System For Utilizing Vehicle Odometer Values And Dynamic Compliance is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for instructing a vehicle where and when to refuel, the method comprising:

receiving at a server a workflow for a vehicle, the workflow comprising an origination location of the vehicle, a destination of the vehicle, a route to the destination, a cargo, a time of departure and a time of arrival;

receiving at the server a real-time operator profile for the operator of the vehicle;

receiving at the server real-time data for the vehicle from a connected vehicle device (CVD) connected to on board diagnostics for the vehicle;

receiving at the server a configuration of the vehicle;

receiving at the server at least one dynamic compliance rule;

receiving at the server at least one configurable real-time vehicle data trigger event;

utilizing at the server a real-time GPS location for the vehicle;

determining at the server at least one fuel stop along the route;

calculating the at least one fuel stop for the vehicle based on the workflow, the real-time operator profile, the configuration of the vehicle, the real-time GPS location of the vehicle, the real-time vehicle data, the at least one dynamic compliance rule, and the selected fuel station profile; and transmitting to the vehicle guidance to the selected at least one fuel stop from the current location of the vehicle, wherein the guidance includes micro-navigation to an exact fuel pump contained within the at least one fuel stop for fueling during a predetermined fueling time period.

2. The method according to claim 1 wherein the real-time data for the vehicle comprises a real-time speed of the vehicle, tire pressure values from at least one tire sensor, at least one refrigeration/HVAC unit value, at least one fluid level, at least one power unit value, a real-time fuel tank capacity, and a fuel type.

3. The method according to claim 2 wherein the at least one configurable real-time vehicle data trigger event comprises a value outside of a predetermined range for the real-time data of the vehicle.

4. The method according to claim 1 further comprising automatically billing an off-site entity for the fuel pumped by the vehicle at the at least one fuel stop.

5. The method according to claim 1 wherein the real-time operator profile comprises one or more of amount of time driving during a pre-determined time period, number of rest breaks during the pre-determined time period, license compliance data, physical disabilities and driving violations.

6. The method according to claim 1 wherein the profile of the at least one fuel stop comprises real-time types of fuels available, set billing instructions, physical dimensions of at least one fuel pump, physical layouts and barriers, obstacles or other limiting constraints that could potentially impede the transit of specific vehicles based on their physical characteristics, GPS coordinates of the fuel stop, hours of operation, food service availability, and resting area availability.

7. The method according to claim 1 wherein the configuration of the vehicle is selected from one of a single vehicle, a vehicle with one or more trailers, and a vehicle with one or more refrigeration trailers.

8. The method according to claim 1 wherein the predetermined fueling time period estimate is a time range describing the expected arrival time in GMT at the specific fuel pump located at the at least one fuel stop based on the real-time GPS location of the vehicle, the real-time speed of the vehicle, the distance to the at least one fuel stop from the real-time GPS location of the vehicle, and the hours of operation of the at least one fuel stop.

9. The method according to claim 1 wherein the at least one dynamic compliance rule comprises speed limits, transport of toxic waste, the transport of refrigerated cargo, the rest durations for operators, the necessary insurance coverage, or the type of taxes and fees to be paid.

10. A method for instructing a vehicle where and when to refuel, the method comprising:
determining a real-time GPS location for a vehicle;
determining at least one fuel stop along a route for the vehicle;
calculating guidance to the at least one fuel stop for the vehicle based on a workflow, a real-time operator profile, a configuration of the vehicle, the real-time GPS location of the vehicle, real-time vehicle data, at least one dynamic compliance rule, and a selected fuel stop profile; and
transmitting to the vehicle the guidance to the at least one fuel stop from the current location of the vehicle, wherein the guidance includes micro-navigation to an exact fuel pump of the at least one fuel stop for fueling during a predetermined time period.

11. The method according to claim 10 wherein the workflow comprises an origination location of the vehicle, a destination of the vehicle, a route to the destination, a cargo, a time of departure and a time of arrival.

12. The method according to claim 10 wherein the real-time data for the vehicle comprises a real-time speed of the vehicle, tire pressure values from at least one tire sensor, refrigeration/HVAC unit values, at least one fluid level, at least one power unit value, a real-time fuel tank capacity, and a fuel type.

13. The method according to claim 12 wherein at least one configurable real-time vehicle data trigger event comprises a value outside of a predetermined range for the real-time data of the vehicle.

14. The method according to claim 10 wherein the real-time operator profile comprises an amount of time driving during a pre-determined time period, a number of rest breaks during the pre-determined time period, license compliance data, physical disabilities and driving violations.

15. The method according to claim 10 wherein the predetermined fueling time period is a time range to fuel the vehicle based on the real-time GPS location of the vehicle, the real-time speed of the vehicle, the distance to the at least one fuel stop from the real-time GPS location of the vehicle, and the hours of operation of the at least one fuel stop.

16. A non-transitory computer-readable medium that stores a program that causes a processor to perform functions for instructing a vehicle where and when to refuel by executing the following steps:
determine a real-time GPS location for a vehicle;
determine at least one fuel stop along a route for the vehicle;
calculate guidance to the at least one fuel stop for the vehicle based on a workflow, a real-time operator profile, a configuration of the vehicle, the real-time GPS location of the vehicle, real-time vehicle data, at least one dynamic compliance rule, and a selected fuel stop profile; and
transmit to the vehicle guidance to the at least one fuel stop from the current location of the vehicle, wherein the guidance includes micro-navigation to an exact fuel pump of the at least one fuel stop for fueling during a predetermined time period.

17. The non-transitory computer readable medium according to claim 16 wherein the workflow comprises an origination location of the vehicle, a destination of the vehicle, a route to the destination, a cargo, a time of departure and a time of arrival.

18. The non-transitory computer readable medium according to claim 16 wherein the real-time vehicle data comprises a real-time speed of the vehicle, tire pressure values from at least one tire sensor, at least one refrigeration/HVAC unit value, at least one fluid level, at least one power unit values, a real-time fuel tank capacity, or a fuel type.

19. The non-transitory computer readable medium according to claim 16 wherein the real-time operator profile comprises an amount of time driving during a pre-determined time period, a number of rest breaks during the pre-determined time period, license compliance data, physical disabilities and driving violations, and wherein the profile of the at least one fuel stop comprises real-time types of fuels available, set billing instructions, physical dimensions of at least one fuel pump, GPS coordinates, hours of operation, food service availability, and resting area availability.

20. The non-transitory computer readable medium according to claim 16 wherein the fueling during a predetermined time period is a time range to fuel the vehicle based on the real-time GPS location of the vehicle, the real-time speed of the vehicle, the distance to the selected fuel stop from the real-time GPS location of the vehicle, and the hours of operation of the at least one fuel stop.

* * * * *